(12) United States Patent
Bharadwaj et al.

(10) Patent No.: US 10,114,149 B2
(45) Date of Patent: Oct. 30, 2018

(54) CLOUD COVERAGE ESTIMATION BY DYNAMIC SCHEDULING OF A DISTRIBUTED SET OF CAMERAS

(71) Applicant: International Business Machines Corporation, Armonk, NY (US)

(72) Inventors: Samarth Bharadwaj, Bangalore (IN); Ramachandra Kota, Bangalore (IN); Pankaj Dayama, Bangalore (IN); Shivkumar Kalyanaraman, Bangalore (IN); Pratyush Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 15/172,566

(22) Filed: Jun. 3, 2016

(65) Prior Publication Data

US 2017/0351006 A1   Dec. 7, 2017

(51) Int. Cl.
  *G01W 1/00* (2006.01)
  *G01W 1/10* (2006.01)
  (Continued)

(52) U.S. Cl.
  CPC .............. *G01W 1/10* (2013.01); *G01W 1/02* (2013.01); *G06K 9/0063* (2013.01); *H04N 5/247* (2013.01)

(58) Field of Classification Search
  None
  See application file for complete search history.

(56) References Cited

U.S. PATENT DOCUMENTS 6,085,152 A * 7/2000 Doerfel ............... G01S 7/003
                                                     702/3
8,977,619 B2   3/2015 Mann et al.
(Continued)

OTHER PUBLICATIONS

Flir, "Solar Farm Surveillance Enhanced with Thermal Imaging Cameras," http://www.flir.fr/cs/display/?id=56542, downloaded Jun. 2, 2016.

(Continued)

*Primary Examiner* — Andre Allen
(74) *Attorney, Agent, or Firm* — Ryan, Mason & Lewis, LLP

(57) ABSTRACT

Methods, systems, and computer program products for cloud coverage estimation by dynamic scheduling of a distributed set of cameras are provided herein. A computer-implemented method includes transmitting one or more instructions to each of multiple spatially-distributed cameras in a pre-determined geographic area, wherein the one or more instructions cause each of the spatially-distributed cameras to change a context from (i) a pre-determined task to (ii) capturing one or more spatio-temporal measurements of cloud coverage; tracking the one or more spatio-temporal measurements of cloud coverage captured by the multiple spatially-distributed cameras; obtaining one or more meteorological measurements from one or more non-camera sources; and generating a cloud coverage forecast for the pre-determined geographic area based on (i) the one or more spatio-temporal measurements of cloud coverage captured by the multiple spatially-distributed cameras and (ii) the one or more meteorological measurements from the one or more non-camera sources.

20 Claims, 4 Drawing Sheets

(51) Int. Cl.
*G01W 1/02* (2006.01)
*H04N 5/247* (2006.01)
*G06K 9/00* (2006.01)

(56) References Cited

U.S. PATENT DOCUMENTS

| | | | |
|---|---|---|---|
| 9,069,103 B2 * | 6/2015 | Williams | ................ G01W 1/00 |
| 9,184,311 B2 | 11/2015 | Baldwin et al. | |
| 2010/0100328 A1 | 4/2010 | Moore et al. | |
| 2012/0155704 A1 * | 6/2012 | Williams | ................ G01W 1/00 382/103 |
| 2014/0320607 A1 | 10/2014 | Hamann et al. | |
| 2015/0212236 A1 | 7/2015 | Haas et al. | |

OTHER PUBLICATIONS

Bosch, "Solar Farms," http://www.boschsecurity.com/en/bosch_security_cloud/05_applications/solar_farms/solar_farms.html, downloaded Jun. 2, 2016.
Siemens, "Protection of Solar Farms," https://www.downloads.siemens.com/download-center/Download.aspx?pos=download&fct=getasset&id1=A6V10454774, 2013.
WT Parker, "WT Parker Protects Large, Remote Solar Farms Against Intrusion and Theft," http://www.wtparker.co.uk/wp-content/uploads/solar-farm-ip-surveillance.pdf, 2012.

\* cited by examiner

CLOUD COVERAGE ESTIMATION BY DYNAMIC SCHEDULING OF A DISTRIBUTED SET OF CAMERAS

FIELD

The present application generally relates to information technology, and, more particularly, to meteorological technologies.

BACKGROUND

Cloud coverage prediction has applications in areas such as solar energy forecast (generating energy production schedules, estimating daily energy yield, optimizing energy utilization and storage, scheduling maintenance, etc.), agriculture (rainfall prediction, etc.), and forecasting weather events (humidity prediction, lightning prediction, etc.). However, existing prediction approaches present accuracy challenges that commonly result in prediction errors.

SUMMARY

In one embodiment of the present invention, techniques for cloud coverage estimation by dynamic scheduling of a distributed set of cameras are provided. An exemplary computer-implemented method can include transmitting one or more instructions to each of multiple spatially-distributed cameras in a pre-determined geographic area, wherein the one or more instructions cause each of the spatially-distributed cameras to change a context from (i) a pre-determined task to (ii) capturing one or more spatio-temporal measurements of cloud coverage. Such a method can also include tracking the one or more spatio-temporal measurements of cloud coverage captured by the multiple spatially-distributed cameras, and obtaining one or more meteorological measurements from one or more non-camera sources. Additionally, such a method can include generating a cloud coverage forecast for the pre-determined geographic area based on (i) the one or more spatio-temporal measurements of cloud coverage captured by the multiple spatially-distributed cameras and (ii) the one or more meteorological measurements from the one or more non-camera sources.

In another embodiment of the invention, an exemplary computer-implemented method can include communicating with each of multiple pre-engaged and spatially-distributed cameras in a pre-determined geographic area to determine one or more configuration parameters for each of the cameras, and transmitting one or more instructions to each of the cameras, wherein the one or more instructions are based on the one or more configuration parameters determined for each of the cameras, and wherein the one or more instructions cause each of the cameras to change a context from (i) a pre-determined task to (ii) capturing one or more spatio-temporal measurements of cloud coverage. Such a method can also include collecting images captured by the cameras in connection with said capturing one or more spatio-temporal measurements of cloud coverage, and tracking the one or more spatio-temporal measurements of cloud coverage based on the collected images. Further, such a method can also include obtaining one or more meteorological measurements from one or more non-camera sources in the pre-determined geographic area, and generating a cloud coverage forecast for the pre-determined geographic area based on (i) the one or more spatio-temporal measurements of cloud coverage and (ii) the one or more meteorological measurements from the one or more non-camera sources.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
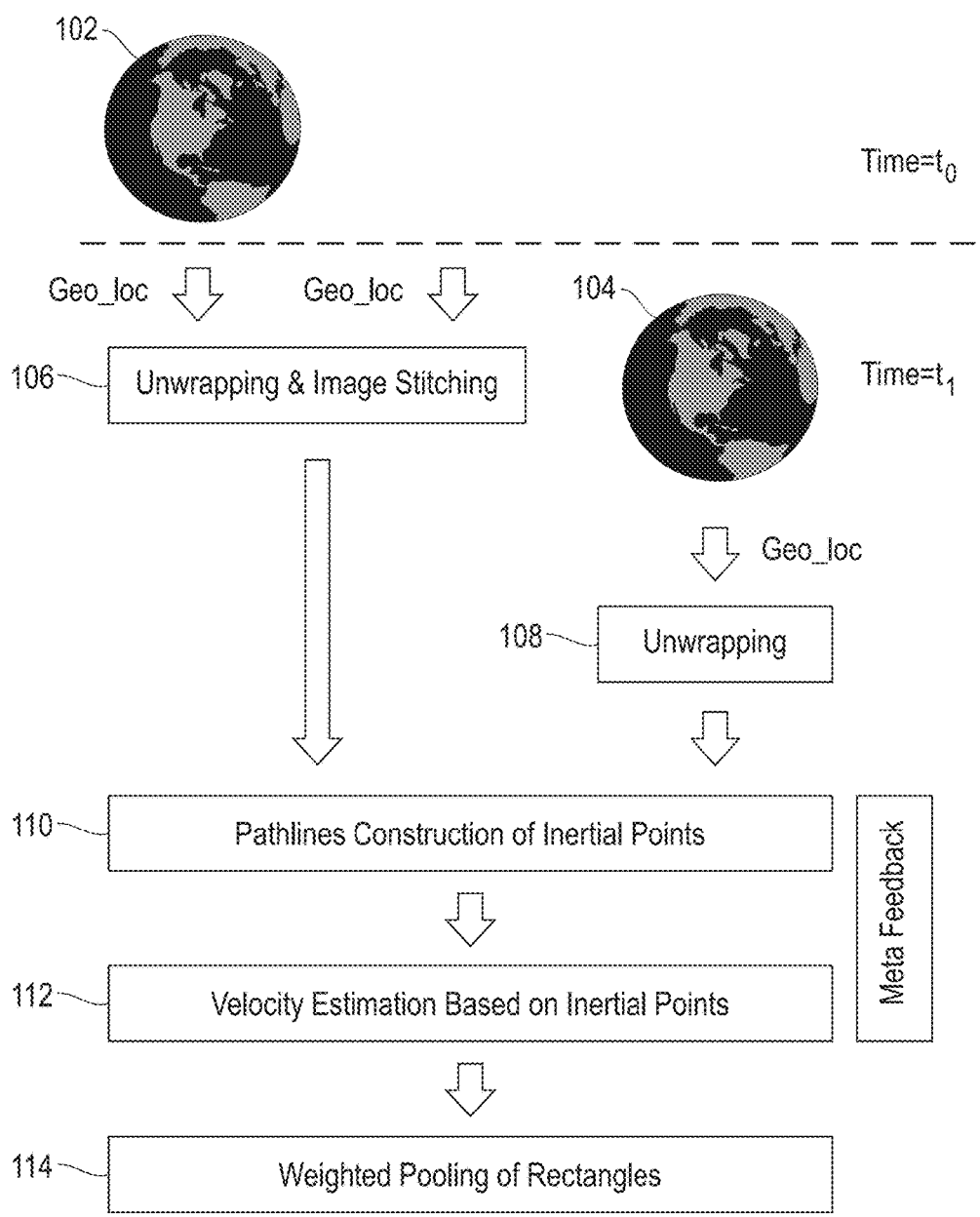
FIG. 1 is a diagram illustrating soft body dynamics and tracking for clouds, according to an embodiment of the invention.

As described herein, an embodiment of the present invention includes systems and techniques for cloud coverage estimation by dynamic scheduling of a distributed set of pre-engaged cameras. At least one embodiment of the invention includes performing and/or regulating intelligent context switching of spatially distributed and pre-engaged networked cameras for cloud tracking based on the opportunity cost of collating direct and/or inverted measurements from local sources (for example, via crowd-sourcing). Also, one or more embodiments of the invention can include communicating with and providing instructions to pre-engaged and spatially distributed networked sources to optimally time the tracking of clouds, as well as implementing soft body dynamics based algorithms for spatio-temporally tracking cloud movement. As used herein, soft body dynamics refers to a branch of fluid mechanics that realistically simulates the motion and behavior of deformable bodies (such as clouds, fog, etc.).

Accordingly, at least one embodiment of the invention can include reconfiguring a network of pre-engaged and spatially-distributed cameras (for example, ground-based cameras) to provide local estimates and forecasts of cloud coverage. Such an embodiment can also include communicating with the distributed pre-engaged cameras to provide instructions for context switching and to receive captured images. Pre-engaged cameras, such as described in connection with one or more embodiments of the invention, can include, for example, traffic cameras, agriculture crop cameras, astronomical cameras, etc.

In at least one embodiment of the invention, reconfiguring a network of pre-engaged and spatially-distributed cameras can include modifying the cameras to enable context switching, as well as intelligently switching the context of one or more of the cameras from a (pre-existing) utility task to capturing cloud coverage measurements based on opportunity cost (for example, the opportunity cost of switching the camera from its current task to capturing cloud coverage measurements) or availability. By way merely of example, such opportunity costs can include, for example, the potential detriment to the original function and/or task of the camera.

As such, one or more embodiments of the invention include modifying a camera so that the camera can be used for dual purposes (such as, for example, modifying a traffic camera to be used for capturing cloud coverage measurements) and determining how to intelligently switch the mode of the camera based on the potential impact on the existing utility task and/or the potential benefit of capturing cloud coverage measurements (for example, the projected improvement in forecast accuracy).

Additionally, at least one embodiment of the invention includes spatio-temporally tracking the movement of clouds from the aggregation of spatially distributed measurements by adopting soft body dynamics based algorithms. Also, one or more embodiments of the invention can include collating and/or inverting measurements from other sources (such as roof-top solar mechanisms, solar pumps, etc.) in addition to the aggregation of spatially distributed measurements to regulate the context switching of one or more cameras. The influence of obstructions, such as clouds, fog, wind systems, and other weather attributes, can be measured and tracked from data obtained from such sources. Additionally, tracking the trajectory of such influence can be utilized in making forecast predictions.

By way merely of example, such an embodiment can include inverting the output of a solar pump to obtain information pertaining to irradiance at the corresponding location, and, hence, infer cloud cover. Such information can then be utilized to regulate the context switching of one or more relevantly-situated cameras. Further, one or more embodiments of the invention can include combining collated local measurements with other macro data sources (such as satellite data, global weather models, historical measurements, etc.) to provide forecasts of different weather parameters. As detailed herein, such other sources can include, for example, rooftop solar panels, solar water pumps, solar street lamps, etc.

At least one embodiment of the invention includes generating and/or implementing a framework, wherein each of multiple pre-engaged and spatially distributed cameras is configured to a remote center. In such an embodiment, various configuration parameters can be shared by the cameras with the remote center. Such configuration parameters can include, for example, a positioning parameter, a type parameter, and a constraint parameter. By way of example, in connection with a positioning parameter, the observable sky can be divided into a grid of equally spaced squares, and each camera i specifies the set of squares that it can accurately capture, denoted as G. Also, in connection with a type parameter, each camera can specify the type of capture (visible, infrared (IR), etc.) it generates as well as and the corresponding resolution of the capture. Further, in connection with a constraint parameter, each camera can specify the time-constraints of availability as a cloud coverage measurements capturing camera i at time t as the Boolean variable $X_{it}$. Each camera can also, for example, specify the size of photographs that it can upload as a network bandwidth limit.

Based on the configuration parameters of each camera and the observed state of the sky, the remote center can instruct each camera to capture parts of the sky at certain times. As further detailed herein, such instruction can be generated via a static approach (fixed, for example, to the first minute of each hour) or a dynamic approach. One or more embodiments of the invention can also include incorporating the opportunity cost of switching contexts for each camera as part of an objective function.

A static time trajectory and coverage approach, as noted above, can be implemented, for example, in scenarios wherein cameras and the remote center cannot communicate often. Such an approach can include implementing static scheduling to cover the observable sky (for example, at each unit of time, at least one camera covers each sky-square) while minimizing cost in terms of the number of capture requests. Additionally, such an approach can be specified as integer linear programming (ILP), wherein for each camera i and time t, a decision variable $Y_{it}$ is defined to denote whether the camera is on or off:

$$\min \sum_{i,t} Y_{it},$$

such that $X_{it} \geq Y_{it}$, $Y_{it} \in \{0, 1\}$, and $$\sum_{i: j \in C_i} Y_{it} \geq 1, \forall j, t.$$

A real-time trajectory and coverage approach, as also noted above, can be implemented, for example, in scenarios wherein cameras and the remote center can (freely and/or regularly) communicate. Such an approach can include implementing dynamic scheduling to cover an observable sky grid based on an information value associated with each cell of the grid (derived from historical data) while minimizing the opportunity cost of capturing cloud coverage measurements. Such an approach can be specified as an ILP, wherein for each camera i and time t, a decision variable $Y_{it}$ is defined to denote whether the camera is on or off:

$$\min \sum_{i,t} W_{it} Y_{it},$$

such that $Y_{it} \in \{0, 1\}$, and $$\sum_{i: j \in C_i} Y_{it} \geq f_{jt} \forall j, t,$$

wherein $f_{jt}$ is the dynamic information value of sensing region j and time t.

FIG. 1 is a diagram illustrating soft body dynamics and tracking for clouds, according to an embodiment of the invention. By way of illustration, FIG. 1 depicts an image 102 captured at time=$t_0$, which is unwrapped and stitched via component 106. As used herein, it is to be understood that "unwrapping" and "stitching" are standard image processing techniques. By way of further description, an unwrapping technique includes converting a radial image to a rectangular image for easier processing. Also, with respect to a stitching technique, when multiple images with overlapping regions are available, stitching can be used to construct a single composite image. Hence, stitching may only be required if multiple images are available at a time instance.

Additionally, FIG. 1 depicts an image 104 captured at time=$t_1$, which is unwrapped via component 108. The unwrapped and stitched image via component 106, as well as the unwrapped image via component 108 are forwarded to components 110 and 112, wherein the images are incorporated with meta feedback obtained from additional sources. Component 110 constructs path lines of inertial points in the images, and component 112 estimates velocity values of objects (clouds) in the images based on the inertial points. Based on the outputs of components 110 and 112, component 114 generates a weighted pooling of rectangles. For a given cloud system, a path line includes an imaginary line connecting a set of inertial points in the system. Inertial points are those points that remain in constant fluid motion (that is, hold the Bernoulli assumption) in the observed period. Additionally, as noted above, the weighted pooling of rectangles can refer to a method to combine multiple evidences to a single consolidated tracking vector for a cloud system.

In connection with the example embodiment depicted in FIG. 1, it is noted that clouds are non-rigid fluid objects that can combine, disintegrate, rotate or flow at different velocities. As noted in FIG. 1, at least one embodiment of the invention can include constructing and/or using path lines to discover multiple connected flow states within which the Bernoulli assumption holds. In such an embodiment, a finite number of inertial points are used to represent a path line and estimate the velocity vector of the path line. Additionally, meta feedback obtained from other sources (such as, for example, satellite imagery) can be incorporated into the inertial point selection based on infant convective cloud position, which is an example of feedback obtained from satellite imagery that indicates the possible formation of convective cloud at a given location. Accordingly, efficient tracking of clouds can be utilized to compute an expected effect of cloud coverage in a given geographic region.

Figure 2:
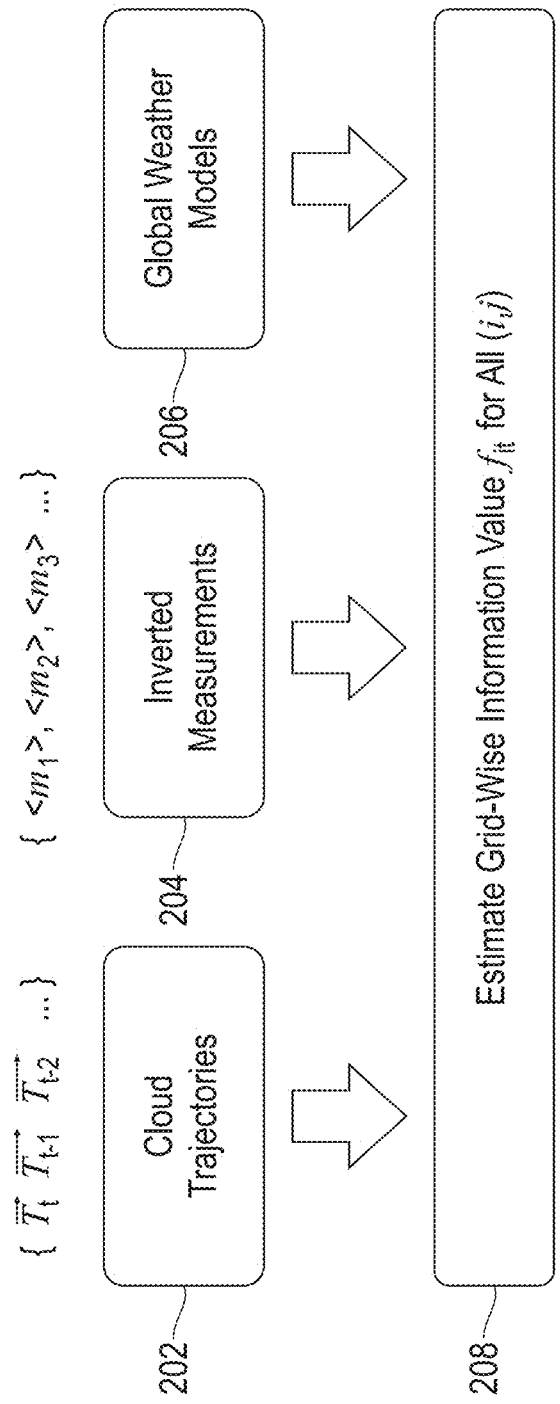
FIG. 2 is a diagram illustrating determining a dynamic information value of a sensing region j and time t, according to an exemplary embodiment of the invention.

FIG. 2 is a diagram illustrating determining a dynamic information value ($f_{jt}$) of a sensing region j and time t, according to an exemplary embodiment of the invention. By way of illustration, FIG. 2 depicts cloud trajectories 202, inverted measurements 204, and global weather models 206, which are provided to component 208 and used to estimate a grid-wise information value ($f_{jt}$) for all (i, j). The cloud trajectories 202 can be obtained from a cloud tracking module as temporal information with forecasting by extrapolating the velocity vectors (such as detailed in connection with FIG. 1, for example). The inverted measurements 204 can be obtained from various reporting entities, and can be collated and/or combined with predictions generated via the global weather models 206. The inverted measurements 204 can also be used to prune and/or validate the cloud trajectories 202. Inverted measurements can be used, for example, to convert the performance measure of a device to the amount of input solar irradiance, which is directly related to the cloud presence near the device.

Forecasts can be utilized to compute the grid-wise estimate of information value ($f_{it}$). An example of the information value ($f_{it}$) can include $(p_{it}-0.5)^2$, wherein $p_{it}$ represents the probability of cloud coverage at region i and time t. This example value can be extended, for example, to a standard entropy definition for a vector at each region-time combination. Additionally, another of the information value ($f_{it}$) can include $(c_{i(t-1)}-P_{it})^2$, wherein $c_{i(t-1)}$ represents the cloud coverage at region i and time (t−1). This example value represents the change in the value at region i from time (t−1) to t.

Figure 3:
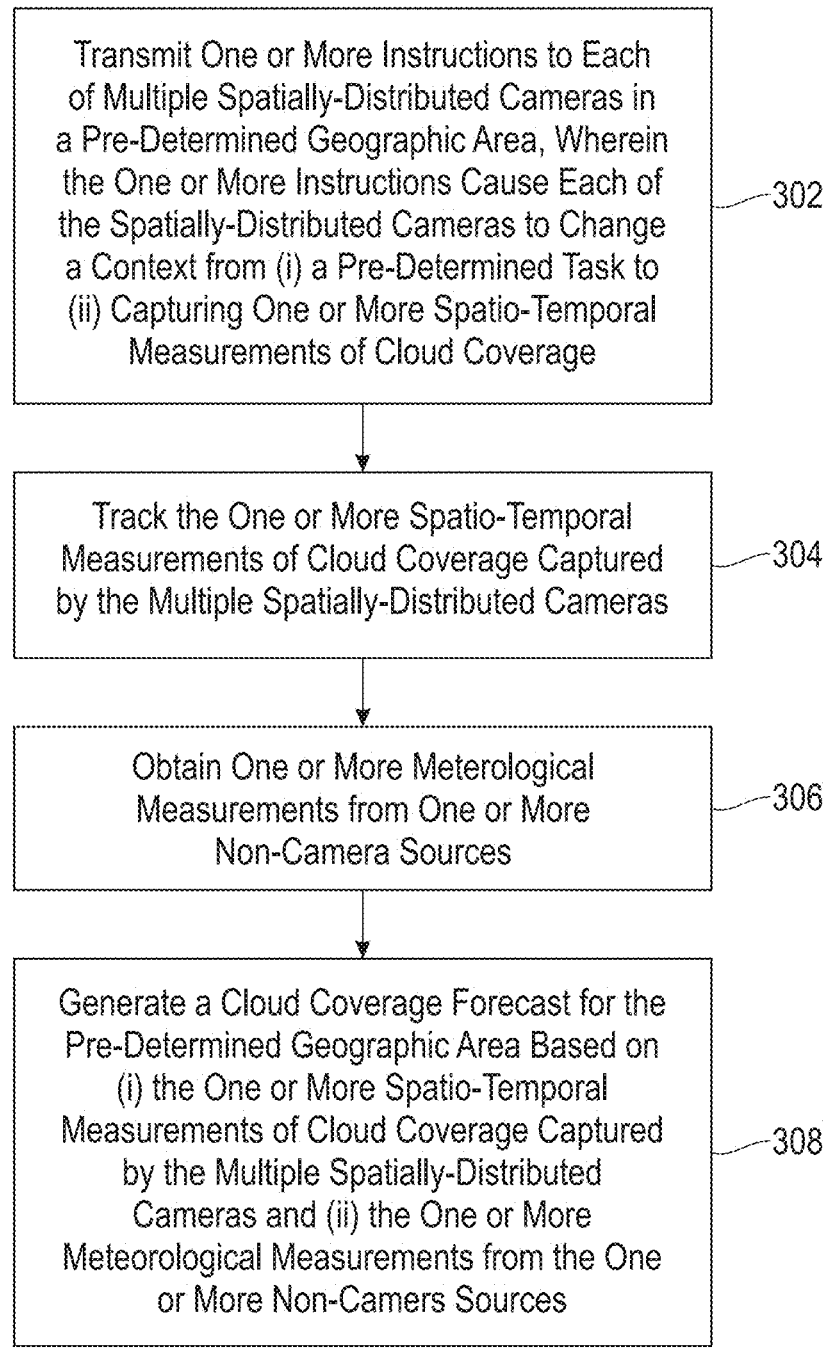
FIG. 3 is a flow diagram illustrating techniques, according to an embodiment of the invention.

FIG. 3 is a flow diagram illustrating techniques, according to an embodiment of the present invention. Step 302 includes transmitting one or more instructions to each of multiple spatially-distributed cameras in a pre-determined geographic area, wherein the one or more instructions cause each of the spatially-distributed cameras to change a context from (i) a pre-determined task to (ii) capturing one or more spatio-temporal measurements of cloud coverage. The spatially-distributed cameras can include, for example, one or more traffic cameras, one or more agriculture crop cameras, and/or one or more astronomical cameras.

The instructions can be based on an opportunity cost arising from changing the context of a given one of the cameras from (i) the pre-determined task of the given camera to (ii) capturing the one or more spatio-temporal measurements of cloud coverage. The opportunity cost can include the potential impact on the pre-determined task as a result of the context change to capturing the one or more spatio-temporal measurements of cloud coverage, and/or the potential benefit to capturing the one or more spatio-temporal measurements of cloud coverage as a result of the context change from the pre-determined task. Such a potential benefit can include, for example, projected improvement in cloud coverage forecast accuracy.

Additionally, the instructions can be based on availability of a given one of the cameras to change the context from (i) the pre-determined task of the given camera to (ii) capturing the one or more spatio-temporal measurements of cloud coverage. Further, the instructions can be based on one or more configuration parameters derived from each of the multiple spatially-distributed cameras, wherein the configuration parameters can include positioning of the given camera, camera type of the given camera, and/or one or more constraints corresponding to the given camera.

Step 304 includes tracking the one or more spatio-temporal measurements of cloud coverage captured by the multiple spatially-distributed cameras. Tracking can include aggregating the one or more spatio-temporal measurements from the spatially-distributed cameras.

Step 306 includes obtaining one or more meteorological measurements from one or more non-camera sources. The non-camera sources can include, for example, one or more solar panel mechanisms and/or one or more solar pumps. Additionally, in at least one embodiment of the invention, the instructions can be based on the one or more measurements obtained from the one or more non-camera sources. Also, the one or more meteorological measurements can include one or more items of satellite data, one or more global weather models, and/or one or more historical meteorological measurements.

Step 308 includes generating a cloud coverage forecast for the pre-determined geographic area based on (i) the one or more spatio-temporal measurements of cloud coverage captured by the multiple spatially-distributed cameras and (ii) the one or more meteorological measurements from the one or more non-camera sources.

Also, an additional embodiment of the invention includes communicating with each of multiple pre-engaged and spatially-distributed cameras in a pre-determined geographic area to determine one or more configuration parameters for each of the cameras, and transmitting one or more instructions to each of the cameras, wherein the one or more instructions are based on the one or more configuration parameters determined for each of the cameras, and wherein the one or more instructions cause each of the cameras to change a context from (i) a pre-determined task to (ii) capturing one or more spatio-temporal measurements of cloud coverage. Such an embodiment can also include collecting images captured by the cameras in connection with said capturing one or more spatio-temporal measurements of cloud coverage, and tracking the one or more spatio-temporal measurements of cloud coverage based on the collected images. Further, such an embodiment can also include obtaining one or more meteorological measurements from one or more non-camera sources in the pre-determined geographic area, and generating a cloud coverage forecast for the pre-determined geographic area based on (i) the one or more spatio-temporal measurements of cloud coverage and (ii) the one or more meteorological measurements from the one or more non-camera sources.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
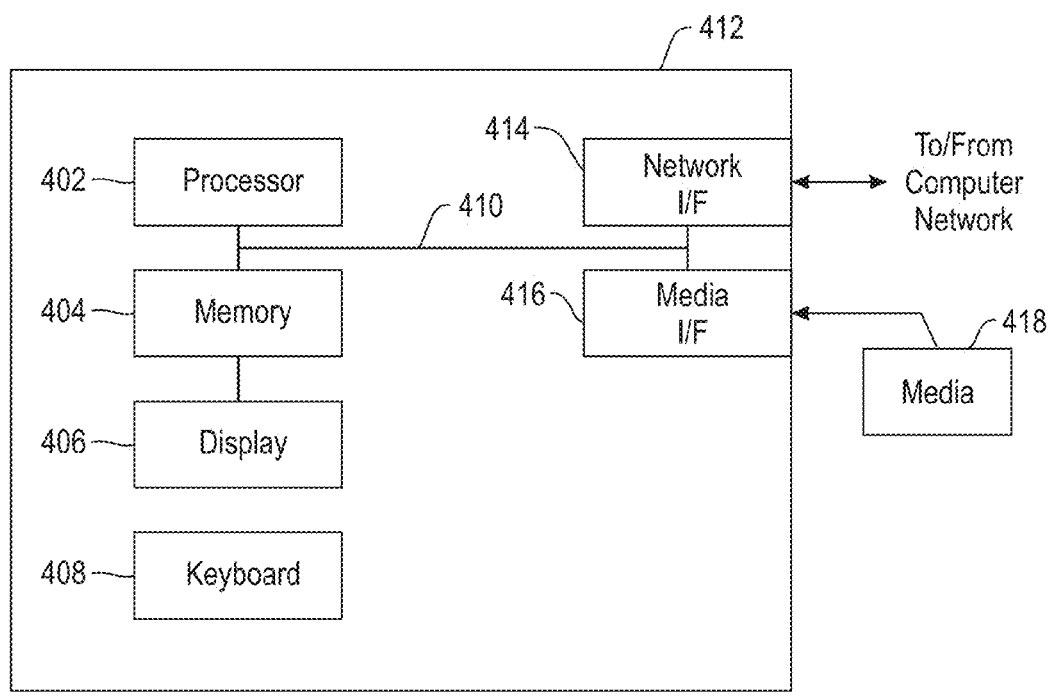
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, reconfiguring a network of pre-engaged and spatially-distributed cameras to provide local estimates and forecasts of cloud cover.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   transmitting one or more instructions to each of multiple spatially-distributed cameras in a pre-determined geographic area, wherein the one or more instructions cause each of the spatially-distributed cameras to change a context from (i) a pre-determined task to (ii) capturing one or more spatio-temporal measurements of cloud coverage;

tracking the one or more spatio-temporal measurements of cloud coverage captured by the multiple spatially-distributed cameras;

obtaining one or more meteorological measurements from one or more non-camera sources; and generating a cloud coverage forecast for the pre-determined geographic area based on (i) the one or more spatio-temporal measurements of cloud coverage captured by the multiple spatially-distributed cameras and (ii) the one or more meteorological measurements from the one or more non-camera sources;

wherein the steps are carried out by at least one computing device.

2. The computer-implemented method of claim 1, wherein the one or more instructions are based on an opportunity cost arising from changing the context of a given one of the cameras from (i) the pre-determined task of the given camera to (ii) capturing the one or more spatio-temporal measurements of cloud coverage.

3. The computer-implemented method of claim 2, wherein the opportunity cost comprises the potential impact on the pre-determined task as a result of the context change to capturing the one or more spatio-temporal measurements of cloud coverage.

4. The computer-implemented method of claim 2, wherein the opportunity cost comprises the potential benefit to capturing the one or more spatio-temporal measurements of cloud coverage as a result of the context change from the pre-determined task.

5. The computer-implemented method of claim 4, wherein the potential benefit to capturing the one or more spatio-temporal measurements of cloud coverage comprises projected improvement in cloud coverage forecast accuracy.

6. The computer-implemented method of claim 1, wherein the one or more instructions are based on availability of a given one of the cameras to change the context from (i) the pre-determined task of the given camera to (ii) capturing the one or more spatio-temporal measurements of cloud coverage.

7. The computer-implemented method of claim 1, wherein the one or more instructions are based on one or more configuration parameters derived from each of the multiple spatially-distributed cameras.

8. The computer-implemented method of claim 7, wherein the one or more configuration parameters comprise positioning of a given camera, camera type of the given camera, and/or one or more constraints corresponding to the given camera.

9. The computer-implemented method of claim 1, wherein the multiple spatially-distributed cameras comprise one or more traffic cameras, one or more agriculture crop cameras, and/or one or more astronomical cameras.

10. The computer-implemented method of claim 1, wherein said tracking comprises aggregating the one or more spatio-temporal measurements from the spatially-distributed cameras.

11. The computer-implemented method of claim 1, wherein the one or more non-camera sources comprise one or more solar panel mechanisms.

12. The computer-implemented method of claim 1, wherein the one or more non-camera sources comprise one or more solar pumps.

13. The computer-implemented method of claim 1, wherein the one or more instructions are based on the one or more measurements obtained from the one or more non-camera sources.

14. The computer-implemented method of claim 1, wherein the one or more meteorological measurements comprises one or more items of satellite data.

15. The computer-implemented method of claim 1, wherein the one or more meteorological measurements comprises one or more global weather models.

16. The computer-implemented method of claim 1, wherein the one or more meteorological measurements comprises one or more historical meteorological measurements.

17. A computer program product comprising a non-transitory computer readable storage medium having program instructions embodied therewith, the program instructions executable by a device to cause the device to:

transmit one or more instructions to each of multiple spatially-distributed cameras in a pre-determined geographic area, wherein the one or more instructions cause each of the spatially-distributed cameras to change a context from (i) a pre-determined task to (ii) capturing one or more spatio-temporal measurements of cloud coverage;

track the one or more spatio-temporal measurements of cloud coverage captured by the multiple spatially-distributed cameras;

obtain one or more meteorological measurements from one or more non-camera sources; and generate a cloud coverage forecast for the pre-determined geographic area based on (i) the one or more spatio-temporal measurements of cloud coverage captured by the multiple spatially-distributed cameras and (ii) the one or more meteorological measurements from the one or more non-camera sources.

18. The computer program product of claim 17, wherein the one or more instructions are based on an opportunity cost arising from changing the context of a given one of the cameras from (i) the pre-determined task of the given camera to (ii) capturing the one or more spatio-temporal measurements of cloud coverage.

19. A system comprising:

a memory; and at least one processor coupled to the memory and configured for:

transmitting one or more instructions to each of multiple spatially-distributed cameras in a pre-determined geographic area, wherein the one or more instructions cause each of the spatially-distributed cameras to change a context from (i) a pre-determined task to (ii) capturing one or more spatio-temporal measurements of cloud coverage;

tracking the one or more spatio-temporal measurements of cloud coverage captured by the multiple spatially-distributed cameras;

obtaining one or more meteorological measurements from one or more non-camera sources; and generating a cloud coverage forecast for the pre-determined geographic area based on (i) the one or more spatio-temporal measurements of cloud coverage captured by the multiple spatially-distributed cameras and (ii) the one or more meteorological measurements from the one or more non-camera sources.

20. A computer-implemented method, comprising:

communicating with each of multiple pre-engaged and spatially-distributed cameras in a pre-determined geographic area to determine one or more configuration parameters for each of the cameras;

transmitting one or more instructions to each of the cameras, wherein the one or more instructions are based on the one or more configuration parameters determined for each of the cameras, and wherein the one or more instructions cause each of the cameras to change a context from (i) a pre-determined task to (ii) capturing one or more spatio-temporal measurements of cloud coverage;

collecting images captured by the cameras in connection with said capturing one or more spatio-temporal measurements of cloud coverage;

tracking the one or more spatio-temporal measurements of cloud coverage based on the collected images;

obtaining one or more meteorological measurements from one or more non-camera sources in the pre-determined geographic area; and generating a cloud coverage forecast for the pre-determined geographic area based on (i) the one or more spatio-temporal measurements of cloud coverage and (ii) the one or more meteorological measurements from the one or more non-camera sources;

wherein the steps are carried out by at least one computing device.

* * * * *